US012484638B2

(12) United States Patent
Lai et al.

(10) Patent No.: US 12,484,638 B2
(45) Date of Patent: Dec. 2, 2025

(54) AEROSOL PROVISION DEVICE

(71) Applicant: Nicoventures Trading limited, London (GB)

(72) Inventors: Sam Lai, London (GB); Rick Yang, Taipei (TW); Hsi Kai Hung, Taipei (TW); Chin Ting Huang, Taipei (TW)

(73) Assignee: NICOVENTURES TRADING LIMITED, London (GB)

( * ) Notice: Subject to any disclaimer, the term of this patent is extended or adjusted under 35 U.S.C. 154(b) by 397 days.

(21) Appl. No.: 18/000,186

(22) PCT Filed: May 27, 2021

(86) PCT No.: PCT/GB2021/051287
§ 371 (c)(1),
(2) Date: Nov. 29, 2022

(87) PCT Pub. No.: WO2021/240156
PCT Pub. Date: Dec. 2, 2021

(65) Prior Publication Data

US 2023/0200455 A1 Jun. 29, 2023

(30) Foreign Application Priority Data

May 29, 2020 (GB) ...................................... 2008076

(51) Int. Cl.
*A24F 40/65* (2020.01)
*A24F 40/10* (2020.01)
(Continued)

(52) U.S. Cl.
CPC .............. *A24F 40/65* (2020.01); *A24F 40/10* (2020.01); *A24F 40/42* (2020.01); *A24F 40/70* (2020.01); *H01Q 1/36* (2013.01); *H01Q 9/04* (2013.01)

(58) Field of Classification Search
CPC .......... A24F 40/10; A24F 40/40; A24F 40/42; A24F 40/65; H01Q 1/22; H01Q 1/27;
(Continued)

(56) References Cited

U.S. PATENT DOCUMENTS 5,173,274 A * 12/1992 Owen ...................... B01J 19/10
261/78.2
2015/0333561 A1* 11/2015 Alarcon .................. A24F 40/90
131/329
(Continued)

FOREIGN PATENT DOCUMENTS

CN 110380219 A 10/2019
JP 63-41909 U 3/1988
(Continued)

OTHER PUBLICATIONS

International Search Report and Written Opinion for Application No. PCT/GB2021/051287, mailed on Aug. 17, 2021, 14 pages.
(Continued)

*Primary Examiner* — Thai Pham
(74) *Attorney, Agent, or Firm* — Burr & Forman

(57) ABSTRACT

A metal housing for an aerosol provision device is described and can include a printed circuit board mounted within the metal housing; a first contact spring providing an electrical connection between a first connection point on an inside of the metal housing and a ground connection of the printed circuit board; and a second contact spring providing an electrical connection between a second connection point on the inside surface of the metal housing and an antenna signal output for providing an antenna signal for transmission by the metal housing. The metal housing includes a radiating conductor element extending from a first surface element to a second surface element, wherein the first and second connection points are provided on the radiating conductor element and wherein a distance between the first and second
(Continued)

surface elements is at least one quarter of a wavelength of the antenna signal transmission.

20 Claims, 7 Drawing Sheets

(51) Int. Cl.

| | |
|---|---|
| ***A24F 40/42*** | (2020.01) |
| ***A24F 40/70*** | (2020.01) |
| ***H01Q 1/22*** | (2006.01) |
| ***H01Q 1/36*** | (2006.01) |
| ***H01Q 9/04*** | (2006.01) |

(58) Field of Classification Search
CPC ............ H01Q 1/273; H01Q 1/44; H01Q 9/04; H01Q 9/0471; H01Q 9/0421
See application file for complete search history.

(56) References Cited

U.S. PATENT DOCUMENTS

| | | | | |
|---|---|---|---|---|
| 2016/0261020 | A1* | 9/2016 | Marion | H01Q 1/22 |
| 2016/0261021 | A1* | 9/2016 | Marion | A24F 40/65 |

FOREIGN PATENT DOCUMENTS

| | | | |
|---|---|---|---|
| JP | 2018514188 | A | 6/2018 |
| JP | 2019502279 | A | 1/2019 |
| TW | M592171 | U | 3/2020 |

OTHER PUBLICATIONS

Notice of Reasons for Rejection from Corresponding Japanese Application No. 2022-570148 mailed Dec. 12, 2023, all pages cited in its entirety.

* cited by examiner

AEROSOL PROVISION DEVICE

PRIORITY CLAIM

The present application is a National Phase entry of PCT Application No. PCT/GB2021/051287, filed May 27, 2021, which claims priority from GB Application No. 2008076.8, filed May 29, 2020, each of which is hereby fully incorporated herein by reference.

TECHNICAL FIELD

The present specification relates to an aerosol provision device, in particular to a housing of an aerosol provision device.

BACKGROUND

Smoking articles, such as cigarettes, cigars and the like burn tobacco during use to create tobacco smoke. Attempts have been made to provide alternatives to these articles by creating products that release compounds without combusting. For example, tobacco heating devices heat an aerosol provision substrate such as tobacco to form an aerosol by heating, but not burning, the substrate. An aerosol provision device may be provided with a means for communication, for example for communication with a mobile communication device of a user of the device. There remains a need for further developments in this field.

SUMMARY

In a first aspect, this specification describes a metal housing for an aerosol provision device (e.g. a housing for an electronic smoking article), the metal housing comprising: a printed circuit board mounted within the metal housing; a first contact spring providing an electrical connection between a first connection point on an inside of the metal housing and a ground connection of the printed circuit board; and a second contact spring providing an electrical connection between a second connection point on the inside surface of the metal housing and an antenna signal output for providing an antenna signal for transmission by the metal housing (such that the metal housing may be used as an antenna, such as a Bluetooth or WiFi antenna), wherein the metal housing comprises a radiating conductor element extending from a first surface element to a second surface element, wherein the first and second connection points are provided on the radiating conductor element and wherein a distance between the first and second surface elements is at least one quarter of a wavelength of the antenna signal transmission.

In some example embodiments, the radiating conductor element is an elliptical cylindrical radiating conductor element, the first surface element is a first elliptical surface element and the second surface element is a second elliptical surface element.

The metal housing may further comprise a signal feed source element and an antenna signal terminal, wherein the antenna signal terminal is connected to the second connection point and the signal feed source element is connected to the antenna signal terminal by the second contact spring.

The metal housing may further comprise an impedance matching circuit, which impedance matching circuit may be adjustable. The impedance matching circuit may be provided on the printed circuit board.

The metal housing may further comprise a control module for generating the antenna signal for transmission. The control module may be configured to cause the transmission of data (e.g. device usage data, battery levels etc.). These data may be collected and used (e.g. displayed or stored) by a user's mobile communication device (e.g. an application on the user's phone that is in communication with the aerosol provision device).

The metal housing may fully enclose the printed circuit board.

In a second aspect, this specification describes a method comprising: inserting a printed circuit board into a metal housing for an aerosol provision device such that a first contact spring of the printed circuit board provides an electrical connection between a first connection point on an inside of the metal housing and a ground connection of the printed circuit board and a second contact spring of the printed circuit board provides an electrical connection between a second connection point on the inside surface of the metal housing and an antenna signal output for providing an antenna signal for transmission (e.g. a Bluetooth signal or a WiFi signal) by the metal housing, wherein the metal housing comprises a radiating conductor element extending from a first surface element to a second surface element, wherein the first and second connection points are provided on the radiating conductor element and wherein a distance between the first and second surface elements is at least one quarter of a wavelength of the antenna signal transmission. The antenna signal may be used for communications with a mobile communication device. Once inserted, the printed circuit board may be fully enclosed by the metal housing.

The method may further comprise matching an impedance between the antenna signal generating circuit and the metal housing and may, for example, include adjusting the impedance matching.

The method may further comprise generating the antenna signal for transmission.

The antenna signal may be used for locating the aerosol provision device.

In a third aspect, this specification describes an aerosol provision device (e.g. a non-combustible aerosol provision device) comprising a metal housing including any of the features of the first aspect.

In a fourth aspect, this specification describes an electronic smoking article comprising an aerosol provision device of the third aspect.

In a fifth aspect, this specification describes a method comprising using an aerosol provision device of the third aspect or an electronic smoking article of the fourth aspect for communications with a mobile communication device.

In a sixth aspect, this specification describes a method comprising: receiving communications at a mobile communication device from an aerosol provision device of the third aspect or an electronic smoking article of the fourth aspect; and determining a location of said aerosol provision device or said electronic smoking article based on the received communications. The method may further comprise plotting the determined location on a display of said mobile communication device.

In a seventh aspect, this specification describes computer-readable instructions which, when executed by computing apparatus, cause the computing apparatus to perform any method as described with reference to the second, fifth or sixth aspects.

In an eighth aspect, this specification describes a kit of parts comprising an article (e.g. a removable article comprising an aerosol generating material) for use in a non-combustible aerosol generating system, wherein the non-combustible aerosol generating system comprises a metal housing including any of the features of the first aspect described above or a device or system including any of the features of the third or fourth aspects described above.

BRIEF DESCRIPTION OF THE DRAWINGS

Example embodiments will now be described, by way of example only, with reference to the following schematic drawings, in which.

DETAILED DESCRIPTION OF THE DRAWINGS

Figure 1:
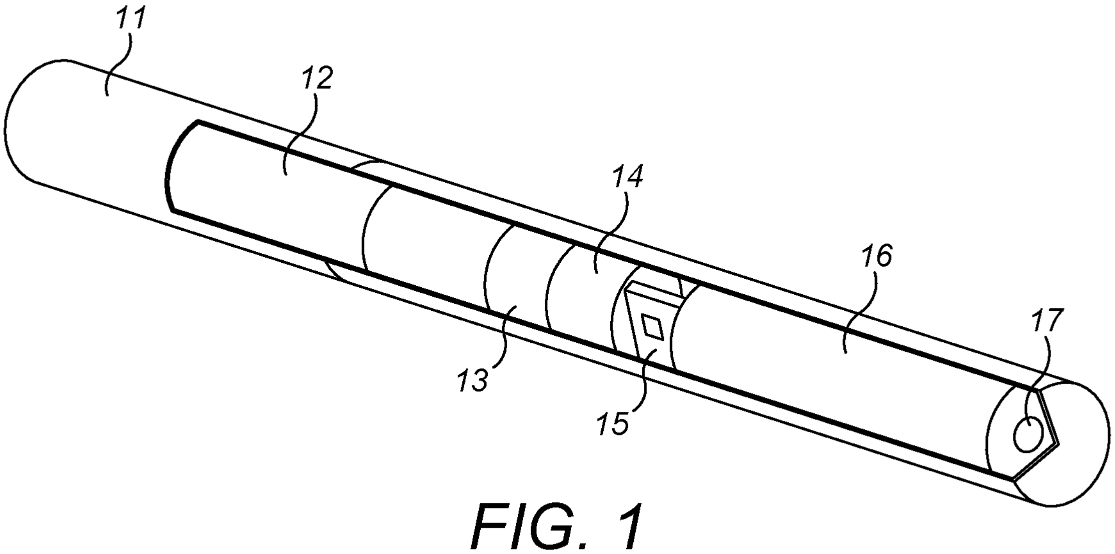
FIG. 1 is a block diagram of a non-combustible aerosol provision device in accordance with an example embodiment.

As used herein, the term "delivery system" is intended to encompass systems that deliver a substance to a user, and includes:

- combustible aerosol provision systems, such as cigarettes, cigarillos, cigars, and tobacco for pipes or for roll-your-own or for make-your-own cigarettes (whether based on tobacco, tobacco derivatives, expanded tobacco, reconstituted tobacco, tobacco substitutes or other smokable material);
- non-combustible aerosol provision systems that release compounds from an aerosolizable material without combusting the aerosolizable material, such as electronic cigarettes, tobacco heating products, and hybrid systems to generate aerosol using a combination of aerosolizable materials;
- articles comprising aerosolizable material and configured to be used in one of these non-combustible aerosol provision systems; and
- aerosol-free delivery systems, such as lozenges, gums, patches, articles comprising inhalable powders, and smokeless tobacco products such as snus and snuff, which deliver a material to a user without forming an aerosol, wherein the material may or may not comprise nicotine.

According to the present disclosure, a "combustible" aerosol provision system is one where a constituent aerosolizable material of the aerosol provision system (or component thereof) is combusted or burned in order to facilitate delivery to a user.

According to the present disclosure, a "non-combustible" aerosol provision system is one where a constituent aerosolizable material of the aerosol provision system (or component thereof) is not combusted or burned in order to facilitate delivery to a user.

In embodiments described herein, the delivery system is a non-combustible aerosol provision system, such as a powered non-combustible aerosol provision system.

In one embodiment, the non-combustible aerosol provision system is an electronic cigarette, also known as a vaping device or electronic nicotine delivery system (END), although it is noted that the presence of nicotine in the aerosolizable material is not a requirement.

In one embodiment, the non-combustible aerosol provision system is a tobacco heating system, also known as a heat-not-burn system.

In one embodiment, the non-combustible aerosol provision system is a hybrid system to generate aerosol using a combination of aerosolizable materials, one or a plurality of which may be heated. Each of the aerosolizable materials may be, for example, in the form of a solid, liquid or gel and may or may not contain nicotine. In one embodiment, the hybrid system comprises a liquid or gel aerosolizable material and a solid aerosolizable material. The solid aerosolizable material may comprise, for example, tobacco or a non-tobacco product.

Typically, the non-combustible aerosol provision system may comprise a non-combustible aerosol provision device and an article for use with the non-combustible aerosol provision system. However, it is envisaged that articles which themselves comprise a means for powering an aerosol generating component may themselves form the non-combustible aerosol provision system.

In one embodiment, the non-combustible aerosol provision device may comprise a power source and a controller. The power source may be an electric power source or an exothermic power source. In one embodiment, the exothermic power source comprises a carbon substrate which may be energized so as to distribute power in the form of heat to an aerosolizable material or heat transfer material in proximity to the exothermic power source. In one embodiment, the power source, such as an exothermic power source, is provided in the article so as to form the non-combustible aerosol provision.

In one embodiment, the article for use with the non-combustible aerosol provision device may comprise an aerosolizable material, an aerosol generating component, an aerosol generating area, a mouthpiece, and/or an area for receiving aerosolizable material.

In one embodiment, the aerosol generating component is a heater capable of interacting with the aerosolizable material so as to release one or more volatiles from the aerosolizable material to form an aerosol. In one embodiment, the aerosol generating component is capable of generating an aerosol from the aerosolizable material without heating. For example, the aerosol generating component may be capable of generating an aerosol from the aerosolizable material without applying heat thereto, for example via one or more of vibrational, mechanical, pressurization or electrostatic means.

In one embodiment, the aerosolizable material may comprise an active material, an aerosol forming material and optionally one or more functional materials. The active material may comprise nicotine (optionally contained in tobacco or a tobacco derivative) or one or more other non-olfactory physiologically active materials. A non-olfactory physiologically active material is a material which is included in the aerosolizable material in order to achieve a physiological response other than olfactory perception. The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical. In some embodiments, the active substance comprises nicotine. In some embodiments, the active substance comprises caffeine, melatonin or vitamin B12.

The aerosol forming material may comprise one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more functional materials may comprise one or more of flavors, carriers, pH regulators, stabilizers, and/or antioxidants.

In one embodiment, the article for use with the non-combustible aerosol provision device may comprise aerosolizable material or an area for receiving aerosolizable material. In one embodiment, the article for use with the non-combustible aerosol provision device may comprise a mouthpiece. The area for receiving aerosolizable material may be a storage area for storing aerosolizable material. For example, the storage area may be a reservoir. In one embodiment, the area for receiving aerosolizable material may be separate from, or combined with, an aerosol generating area.

Aerosolizable material, which also may be referred to herein as aerosol generating material, is material that is capable of generating aerosol, for example when heated, irradiated or energized in any other way. Aerosolizable material may, for example, be in the form of a solid, liquid or gel which may or may not contain nicotine and/or flavorants. In some embodiments, the aerosolizable material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it.

The aerosolizable material may be present on a substrate. The substrate may, for example, be or comprise paper, card, paperboard, cardboard, reconstituted aerosolizable material, a plastics material, a ceramic material, a composite material, glass, a metal, or a metal alloy.

A consumable is an article comprising or consisting of aerosol-generating material, part or all of which is intended to be consumed during use by a user. A consumable may comprise one or more other components, such as an aerosol-generating material storage area, an aerosol-generating material transfer component, an aerosol generation area, a housing, a wrapper, a mouthpiece, a filter and/or an aerosol-modifying agent. A consumable may also comprise an aerosol generator, such as a heater, that emits heat to cause the aerosol-generating material to generate aerosol in use. The heater may, for example, comprise combustible material, a material heatable by electrical conduction, or a susceptor.

A susceptor is a material that is heatable by penetration with a varying magnetic field, such as an alternating magnetic field. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor may be both electrically-conductive and magnetic, so that the susceptor is heatable by both heating mechanisms. The device that is configured to generate the varying magnetic field is referred to as a magnetic field generator, herein.

FIG. 1 is a block diagram of a non-combustible aerosol provision device, indicated generally by the reference numeral 10, in accordance with an example embodiment. The aerosol provision device 10 (such as an e-cigarette) comprises a mouthpiece 11, a cartridge or pod 12, an atomizer 13, a sensor 14, a control module 15, a battery 16 (e.g. a rechargeable lithium battery) and an LED 17 (or some other illumination device). The control module 15 may comprise a microprocessor.

In a use of the aerosol provision device 10, a user inhales from the mouthpiece 11. The cartridge of pod 12 may store a liquid solution (e.g. of glycerol, flavorings and nicotine).

The sensor 14 may be an air flow sensor configured to sense the air flow inhaled by a user and may provide an input to the control module 15. Functions of the control module 15 may include controlling the atomizer 13 and the LED 17. The device 10 may use the atomizer 13 to seek to simulate a smoke-like vapor flavor. The LED indicator light 17 may illuminate when used, simulating the fire light during smoking.

The control module 15 may include a communications means, such as a Bluetooth chip or WiFi chip. The communication means may be integrated into a microprocessor of the control module 15. An antenna (discussed in detail below) enables the communications means to communicate with a remote device (such as a mobile phone, a mobile communication device, a laptop, a computer or some other device), to enable information to be provided to a user.

As discussed in detail below, the antenna may be provided by a metal shell or housing (e.g. a shell, housing or sleeve of the aerosol provision device 10). The antenna may be planar inverted F (PIFA) antenna.

The aerosol provision device 10 may include a connector, such as a USB connector (not shown) that enables a connection to be made to a power source for charging a battery 16.

The aerosol provision device 10 is provided by way of example only; many variants and alternatives are possible.

Figure 2:
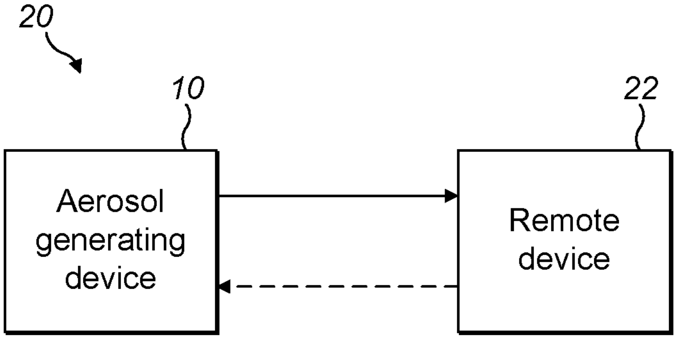
FIG. 2 is a block diagram of a system in accordance with an example embodiment.

FIG. 2 is a block diagram of a system, indicated generally by the reference numeral 20, in accordance with an example embodiment. The system 20 comprises the aerosol provision device 10 and a remote device 22 (i.e. remote from the aerosol provision device). The remote device 22 may, for example, be a mobile phone, a mobile communication device, a laptop, a computer or a similar device, and may be owned by a user of the aerosol provision device 10.

As indicated above (and discussed in further detail below), the aerosol provision device 10 has an output that transmits a signal (such as a Bluetooth signal or a WiFi signal). The transmitted signal can be detected by the remote device 22 such that the aerosol provision device 10 can communicate with the remote device 22. In some example embodiments, the remote device 22 is able to transmit to the aerosol provision device 10 (as indicated by the dotted line in the system 20), but this is not essential to all embodiments.

The signal transmitted from the aerosol provision device 10 to the remote device 22 may be used to transmit information such as how many e-cigarettes a user puffs or the amount of remaining liquid per day. The skilled person will be aware of many other examples of data that may be transmitted from the aerosol provision device 10 to the remote device 22 (or, indeed, data that may be transmitted from the remote device 22 to the aerosol provision device 10).

Figure 3:
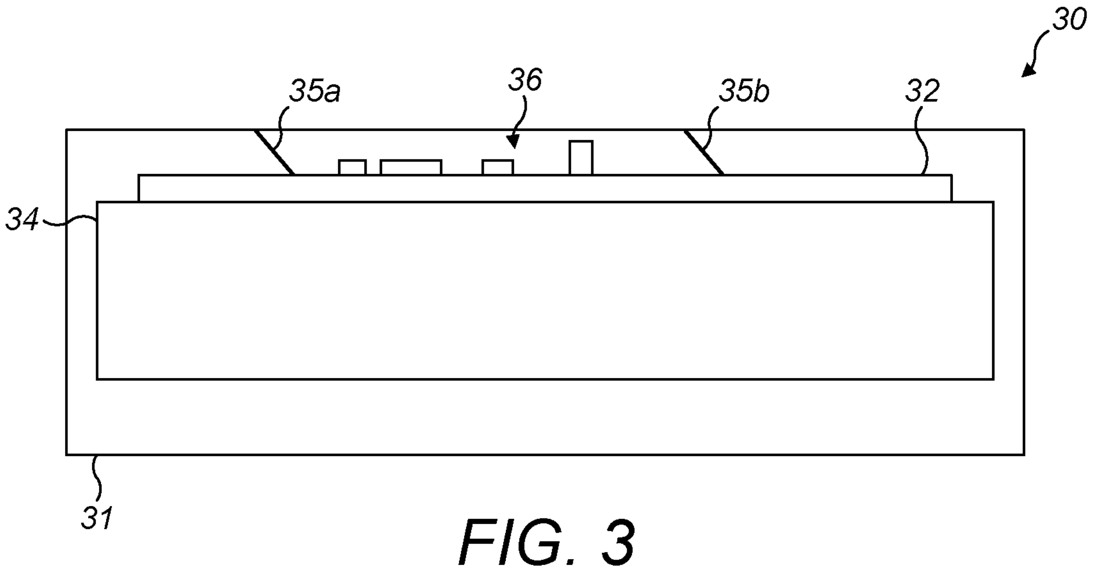
FIG. 3 is a block diagram of a housing in accordance with an example embodiment.

FIG. 3 is a block diagram of a housing, indicated generally by the reference numeral 30, in accordance with an example embodiment. The housing 30 comprises an outer sleeve 31, such as an aluminum sleeve, which sleeve may provide the exterior of at least some of the aerosol provision device 10 described above. Note that the housing 30 may be used with alternative aerosol provisioning or generating devices and electronic smoking articles.

As shown in FIG. 3, a printed circuit board 32 and a battery 34 are mounted within the metal housing 30. The electronic components of the control module 15 may be provided on the printed circuit board 32. Other components may also be provided (such as the atomizer 13). Note that although the battery 34 is shown below the printed circuit board 32, this is just one example implementation. The printed circuit board and the battery may, for example, be provided side-by-side.

A first contact spring 35*a* provides an electrical connection between a first connection point on an inside of the sleeve 31 and a ground connection of the printed circuit board. Similarly, a second contact spring 35*b* provides an electrical connection between a second connection point on the inside surface of the sleeve 31 and an antenna signal output for providing an antenna signal for transmission by the metal housing (such that the metal housing 30 can be used as an antenna).

A plurality of circuit elements, indicated generally by the reference numeral 36, are shown on the printed circuit board 32, as discussed further below.

Figure 4:
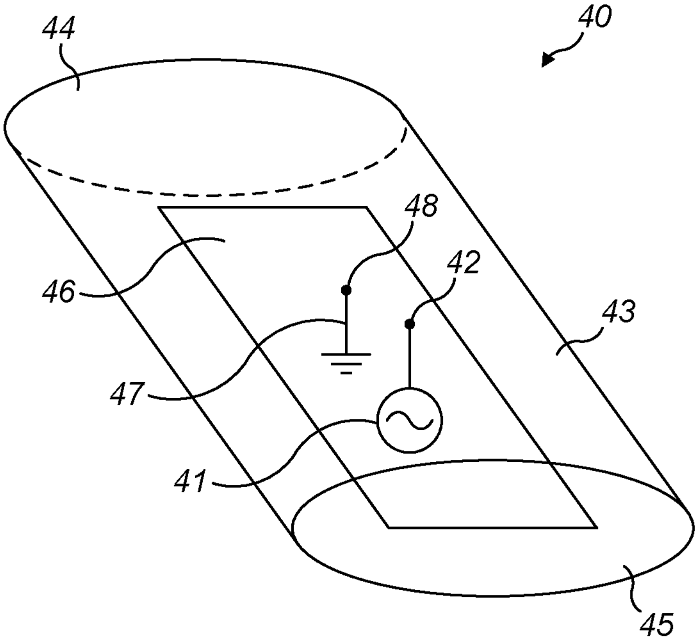
FIG. 4 is a block diagram of a housing in accordance with an example embodiment.

FIG. 4 is a block diagram of a housing, indicated generally by the reference numeral 40, in accordance with an example embodiment. The housing 40 is an example implementation of the housing 30 described above. The housing 40 may be a sleeve. The housing 40 may be an elliptical cylindrical shape and may be resilient such that there is some flexibility in the shape of the housing. The housing 40 may be shaped dependent on a shape of the aerosol provision device 10 (and may, for example, have a circular, rectangular, elliptical, diamond or any other shape).

The housing 40 comprises a signal feed source element 41, an antenna signal terminal 42, a radiating conductor element 43, a first surface element 44, a second surface element 45, a metal ground plane element 46 and a metal dome element 47. The radiating conducting element 43 extends from the first surface element 44 to the second surface element 45. A distance between the first and second surface elements is at least one quarter of a wavelength of the antenna signal transmission, such that the antenna signal transmission has an acceptable efficiency.

Although not shown in FIG. 4 the first and second connection points of the metal housing referred to above with respect to FIG. 3 are provided on the radiating conductor element 43.

In the specific configuration shown in FIG. 4, the radiating conductor element 43 is an elliptical cylindrical radiating conductor element. Similarly, the first and second surface elements 44 and 45 are elliptical surface elements. However, this is not essential to all example embodiments. The housing 40 may be shaped dependent on a shape of the aerosol provision device 10 (and may, for example, have a circular, rectangular, elliptical, diamond or any other shape). Similarly, the radiating conductor element 43 and the first and second surface elements 44 and 45 may be shaped based on the shape of the housing 40 and may therefore have a circular, rectangular, elliptical, diamond or any other shape.

The signal feed source element 41 is connected to the antenna signal terminal 42 and the antenna signal terminal 42 is connected to the radiating conductor element 43. The antenna signal terminal 42 may be connected to the second connection point described above. More specifically, the signal feed source element 41 may be connected to the antenna signal terminal 42 or the radiating conductor element 43 by the second contact spring 35*b* described above.

The radiating conductor element 43 covers the metal ground plane element 46. The metal ground plane element 46 can be provided with a Bluetooth chip or a WiFi chip, a battery, a microprocessor, air flow sensors, LED indicators and other components. Thus, the housing 40 may enclose some or all of the elements of the aerosol provision device 10 described above. (Note that some of the element of the aerosol provision device 10 may be provided outside the housing 40 and may, for example, be connected to an exterior of the housing 40.)

As shown in FIG. 4, one end of the metal dome element 47 is connected to the radiating conductor element 43, and the other end is connected to the metal ground plane element 46 which forming a ground, the electrical characteristic is zero ohm. In fact, the metal dome element 47 can be replaced by a contact spring, pogo pin, thimble or similar element. The metal dome element 47 is therefore an electrical conductor that electrically connects the radiating conductor element 43 and the metal ground plane element 46. The impedance matching of the antenna can be adjusted by adjusting the distance between the position of the signal feed source element 41 and the position of the metal dome element 47 (e.g. by adjusting the distance between the first and second connection points described above). The signal feed source element 41 at a resonance point impedance (resistance) of 50Ω, and the reactance should be close to zero, which can achieve good impedance matching and can thereby stimulate the maximum electromagnetic radiation transmission signal. The first surface element 44 and the second surface element 45, both of which are made of electrical materials, can be metal conductors or plastic materials.

The radiating conductor element 43 can excite a first resonance mode frequency, when the length of the first surface element 44 extending from the radiating conductor element 43 to the second surface element 45 is a quarter wavelength of the transmission. Similarly, the radiating conductor element 43 can excite a second resonance mode frequency, when the length of the first surface element 44 extending from the radiating conductor element 43 to the second surface element 45 is three-quarters of the wavelength of transmission. Finally, the radiating conductor element 43 can excite a third resonance mode frequency, when the length of the first surface element 44 extending from the radiating conductor element 43 to the second surface element 45 is five-quarters of the wavelength of transmission. Of course, other resonance modes (e.g. at longer wavelengths) are also possible. Note that in some example embodiments, the second resonance mode frequency may be the preferred transmission mode (as discussed further below).

A distance between the first and second surface elements may be set at one quarter of a wavelength of the antenna signal transmission, as this is a point of high efficiency of the antenna signal transmission. In some example embodiments, there is insufficient design freedom to set the distance between the first and second surface elements with precision. In such cases, it may be sufficient that the distance between the first and second surface elements is at least one quarter of a wavelength of the antenna signal transmission.

A number of variants to the housing 40 are possible. For example, the first surface element 44 and the second surface element 45 may be provided with holes in the surface for some functions such as LED lights, buttons, air inlets or charging docks.

Figure 5:
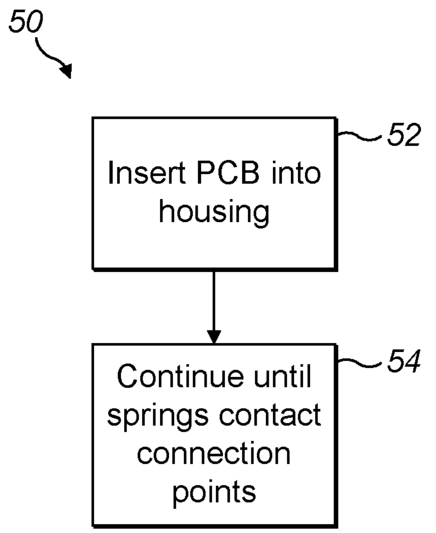
FIG. 5 is a flow chart showing an algorithm in accordance with an example embodiment.

FIG. 5 is a flow chart showing an algorithm, indicated generally by the reference numeral 50, in accordance with an example embodiment.

The algorithm 50 starts at operation 52, where the printed circuit board 32 is inserted into the metal housing 30 (or the housing 40).

At operation 54, the insertion of the printed circuit board 32 continues until the first contact spring 35*a* and the second contact spring 35*b* contact first and second connection points on the inside of the metal housing respectively. In this configuration, the first contact spring 35*a* provides an electrical connection between the first connection point and a ground connection of the printed circuit board and the second contact spring 35*b* provides an electrical connection between the second connection point and an antenna signal output for providing an antenna signal for transmission by the metal housing.

When the algorithm 50 is complete, the printed circuit board 32 is fully enclosed within the metal housing 30 or 40.

Figure 6:
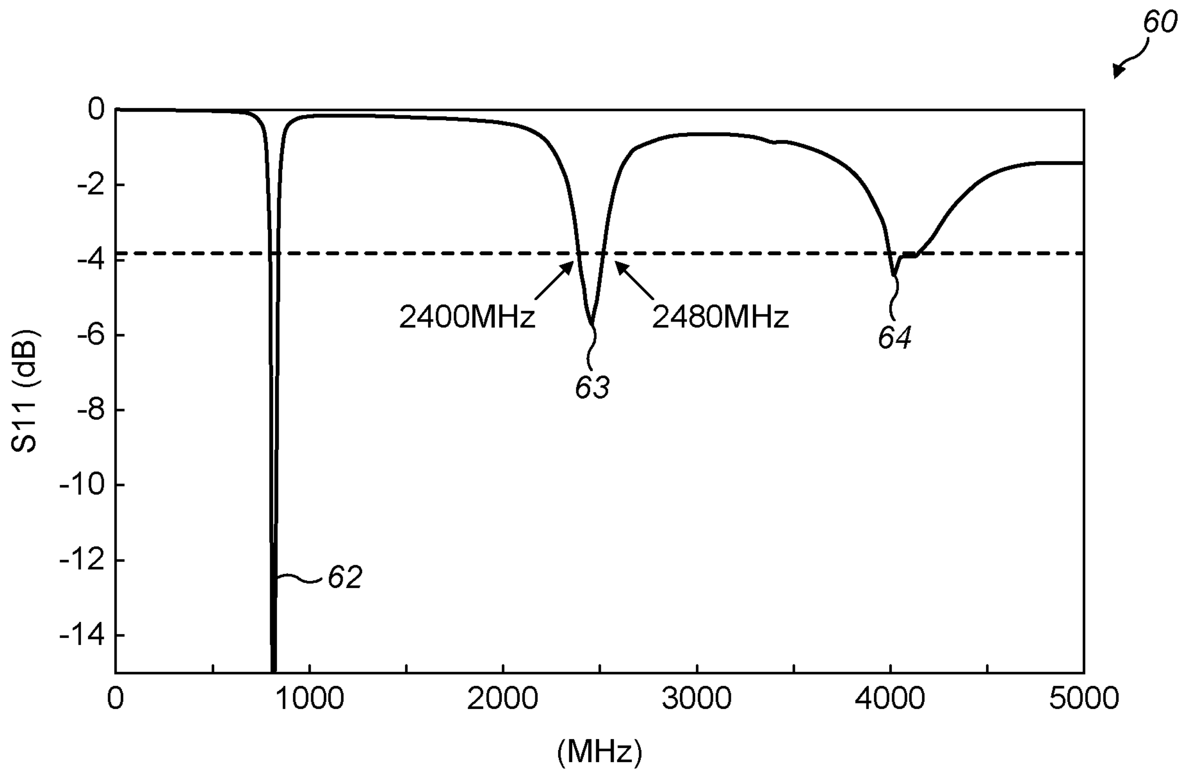
FIGS. 6 and 7 are plots showing functionality in accordance with example embodiments.

FIG. 6 is a plot, indicated generally by the reference numeral 60, showing functionality in accordance with an example embodiment.

The plot 60 shows a measured reflection loss (S11) for transmissions made using the metal housing 40 as an antenna. The plot 60 clearly shows frequencies at which the loss decreases substantially, these are indicated as a first resonance mode frequency 62, a second resonance mode frequency 63 and a third resonance mode frequency 64. The center frequency of the first resonance mode frequency 62 is 810 MHz, the center frequency of the second resonance mode frequency 63 is 2430 MHz and center frequency of the three-resonance mode frequency 64 is 4050 MHz. The second-resonance mode frequency 63 covers the wireless Bluetooth communication frequency and the WiFi 2.4G communication frequency. Accordingly, the metal housing 40 may use the second resonance mode frequency 63 for Bluetooth or WiFi transmissions.

In one example embodiment, in the first resonance mode, the length of the first surface element 44 extending from the radiating conductor element 43 to the second surface element 45 is one quarter of the wavelength of transmission, in the second resonance mode, that length may be three-quarters of the wavelength of transmission, and in the third resonance mode, that length may be five-quarters of the wavelength of transmission.

In the event of a Bluetooth or WiFi signal being transmitted at about 2.4 GHz (having a wavelength of the order of 12.5 centimeters), the first and second surface elements may be separated by a distance of the order of 9.4 centimeters in order to operate in the second resonance mode.

The structure of the housing 40 may be adjustable (e.g. during a design phase). For example one or more of the shape, length or thickness of one or more of the radiating conductor element 43, the first surface element 44 and the second surface element 45 may be adjustable. Such adjustments may have an impact of the frequencies at which the first, second and third resonance modes occur.

Figure 7:
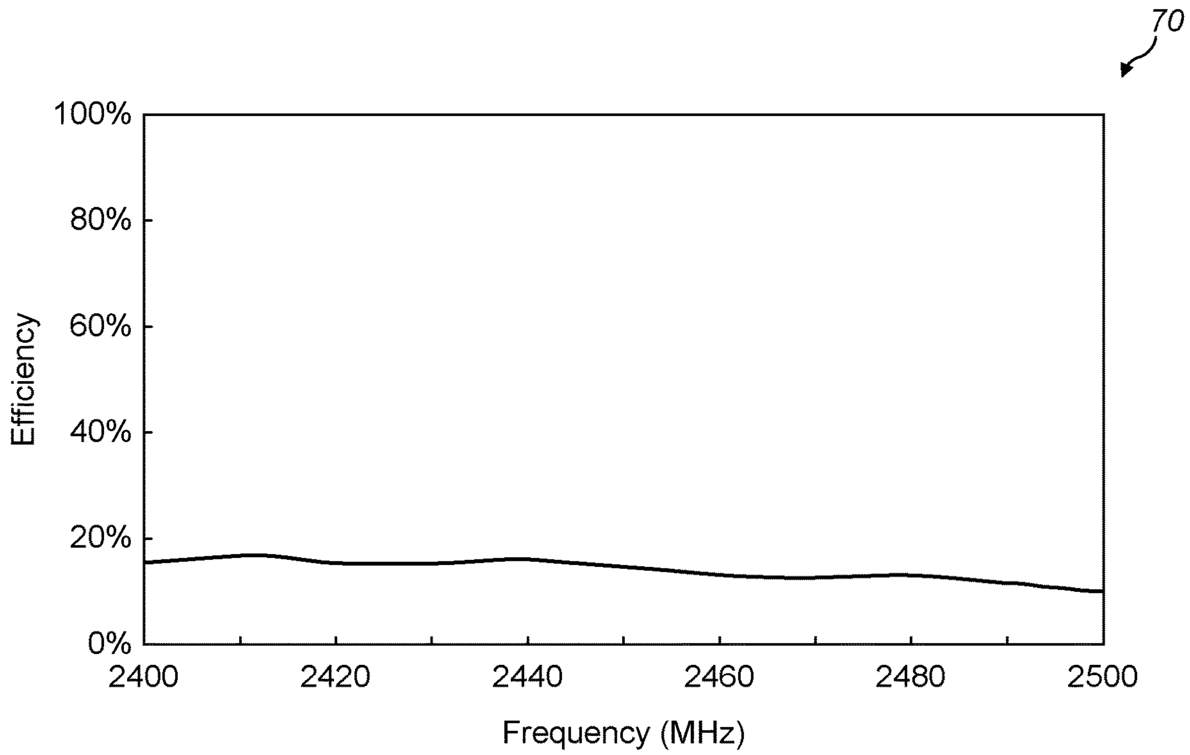

FIG. 7 is a plot, indicated generally by the reference numeral 70, showing functionality in accordance with an example embodiment. The plot 70 shows an efficiency diagram of the second resonance mode antenna.

Figure 8:
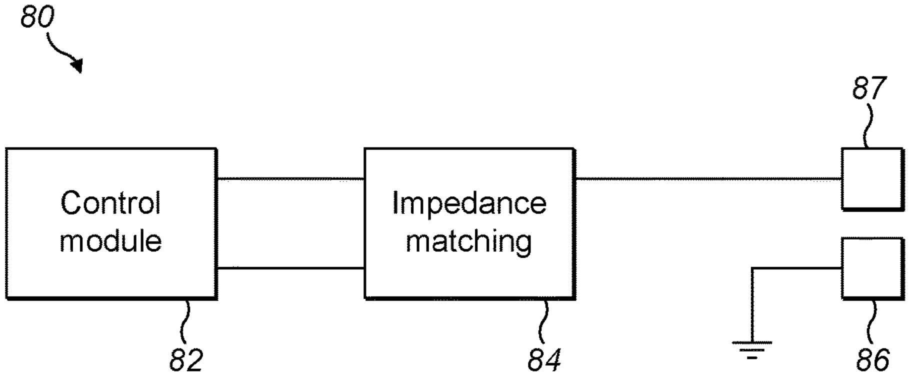
FIG. 8 is a block diagram of a circuit used in an example embodiment.

FIG. 8 is a block diagram of a circuit, indicated generally by the reference numeral 80, used in an example embodiment.

The circuit 80 comprises a control module 82, an impedance matching circuit 84, a first connection point 86 and a second connection point 87. The control module 82 and the impedance matching circuit 84 may be formed from the circuit elements 36 on the printed circuit board 32 described above.

The control module 82 is used to generate the antenna signal for transmission. The control module 82 may, for example, be configured to transmit data from the aerosol provision device 10 to the remote device 22 described above. By way of example, data such as aerosol device usage data, battery level etc. could be transmitted. These data may be collected and used (e.g. displayed or stored) at the remove device 22. For example, the remote device 22 may be a mobile phone having an application that can be used to display information relating to the aerosol provision device 10.

The first and second connection points 86 and 87 are the first and second connection points referred to in the algorithm 50 discussed above. Thus, when the printed circuit board is fully inserted, the first contact spring 35*a* connects the first connection point 86 to ground and the second contact spring 35*b* connects the output of the impedance matching circuit 84 to the second connection point 87.

Thus, the control module 82 can make use of the first and second connection points 86 and 87 for the transmission of an antenna signal (e.g. Bluetooth signal or a WiFi signal).

Figure 9:
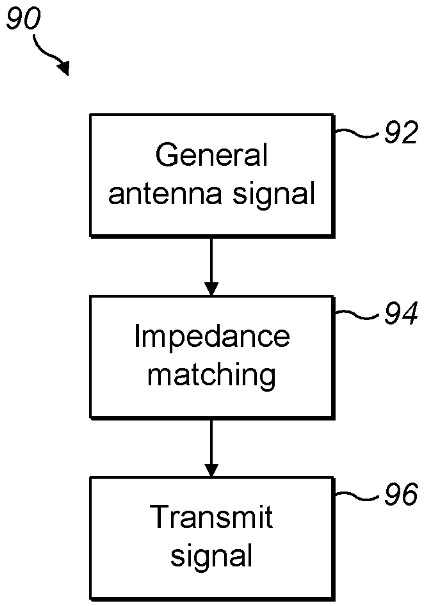
FIG. 9 is a flow chart showing an algorithm in accordance with an example embodiment.

FIG. 9 is a flow chart showing an algorithm, indicated generally by the reference numeral 90, in accordance with an example embodiment.

The algorithm 90 starts at operation 92, wherein an antenna signal is generated. As discussed above, the antenna signal may be generated by the control module 82.

At operation 94, impedance matching is provided between the antenna signal generating circuit (the control module 82) and the transmitting antenna (the metal housing 30 or 40). The impedance matching is implemented by the impedance matching circuit 84.

At operation 96, the signal is transmitted, using the metal housing as the antenna. The transmission may take the form of a Bluetooth signal or a WiFi signal.

The first and second connection points 86 and 87 are provided on the inside surface of the metal housing 30 or 40 and may be separated by a defined multiple of a wavelength of transmission of the antenna signal (e.g. one quarter, three-quarters or five-quarters of the wavelength of transmission).

Figure 10:
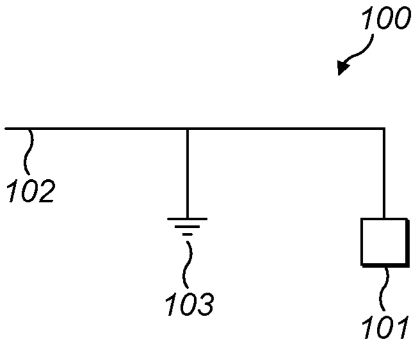
FIG. 10 is a block diagram of an antenna arrangement in accordance an example embodiment.

FIG. 10 is a block diagram of an antenna arrangement, indicated generally by the reference numeral 100, in accordance with an example embodiment. The antenna arrangement is a planar inverter F-antenna; other antenna arrangements could be used in other example embodiments.

The antenna arrangement 100 includes a signal node 101 (such as the signal feed source element 41 described above) a conductor 102 (such as the radiating conductor element 43 described above) and a ground connection 103.

The ground connection 103 is connected to the conductor 102, for example using a spring such as the first contact spring 35*a* described above.

The signal node 101 is connected to the conductor 102, for example using a spring such as the second contact spring 35*b* described above.

As discussed above with reference to FIG. 2, an antenna signal may be sent from an aerosol provision device 10 (such as an electronic smoking article) to a remote device 22 (such as a mobile communication device). The remote device may use the data in many different ways.

Figure 11:
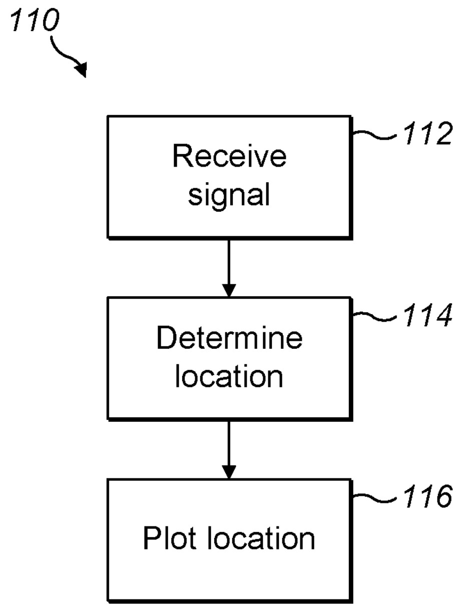
FIG. 11 is flow chart showing an algorithm in accordance with an example embodiment.

By way of example, FIG. 11 is a flow chart showing an algorithm, indicated generally by the reference numeral 100, in accordance with an example embodiment. The algorithm 110 shows one example use of data that may be obtained by the remote device 22 from the aerosol provision device 10.

The algorithm 110 starts at operation 112, where a signal is received at the remote device 22 or some other mobile communication device from the aerosol provision device 10, an electronic smoking article or some similar device.

At operation 114, the location of said aerosol provision device, electronic smoking article or similar device is determined based on the received communications. The location determination may take the form of determining the location of the transmission relative to the location of the reception.

At optional operation 116, the location determined in operation 114 may be plotted, for example on a display of the remote device or mobile communication device.

Figure 12:
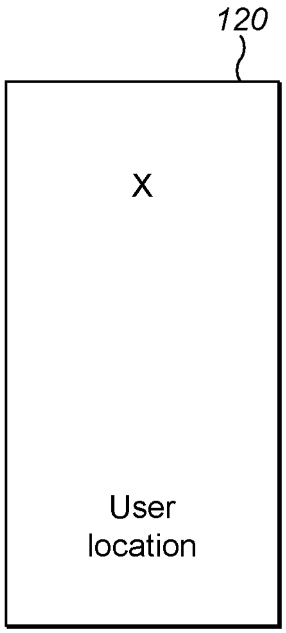
FIG. 12 shows an example user interface in accordance with an example embodiment.

FIG. 12 shows an example user interface, indicated generally by the reference numeral 120, in accordance with an example embodiment. The user interface 120 may be output by the remote device 22 or by some other mobile communication device.

The user interface shows a user location (e.g. a location of the remote device 22) together with an indicator of the position of the aerosol provision device 10 (marked with an "X" in the user interface 120).

Of course, the user interface 120 is provided by way of example only; many alternative display configuration could be provided, including displaying other forms of data.

Figure 13:
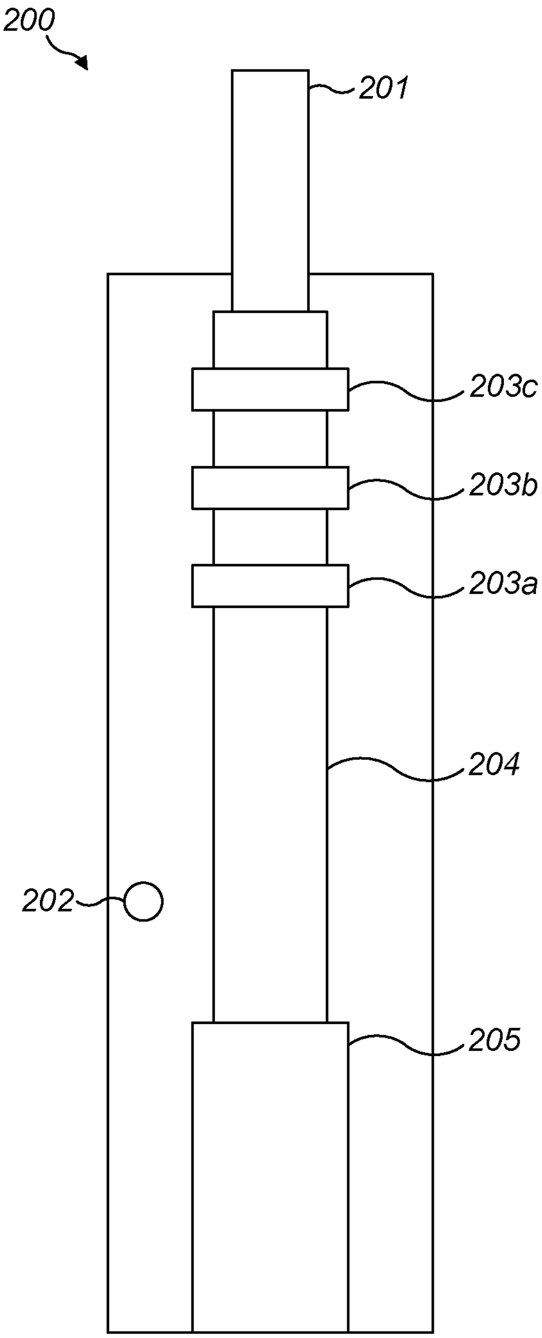
FIG. 13 is a block diagram of a non-combustible aerosol provision device in accordance with an example embodiment.

As discussed above, the aerosol provision device 10 is described by way of example only; many variants and alternatives are possible. By way of example, FIG. 13 is a block diagram of a non-combustible aerosol provision device, indicated generally by the reference numeral 200, in accordance with an example embodiment. The aerosol provision device 200 is an example implementation of the aerosol provision device 10 described above.

FIG. 13 shows the aerosol provision device 200 without an outer cover. The aerosol provision device 200 may comprise a replaceable article 201 that may be inserted in the aerosol provision device 200 to enable heating of the article 201. The aerosol provision device 100 further comprises an activation switch 202 that may be used for switching on or switching off the aerosol provision device 200 and a plurality of heating elements 203*a*, 203*b* and 203*c*, and one or more air tube extenders 204 and 205. The one or more air tube extenders 204 and 205 may be optional.

The heating elements 203*a*, 203*b* and 203*c* may be heaters that directly heat the article 201. Alternatively, the heating elements 203*a*, 203*b* and 203*c* may be inductive heating elements that are configured to interact with a susceptor comprised within the article 201 (or provided elsewhere). The use of three heating elements 203*a*, 203*b* and 203*c* is not essential to all example embodiments. Thus, the aerosol provision device 100 may comprise one or more heating elements.

A susceptor may be provided as part of the article 201. In an example embodiment, when the article 201 is inserted in aerosol provision device, the aerosol provision device 200 may be turned on due to the insertion of the article 201. When the aerosol provision device 100 is turned on, the (inductive) heating elements 203 (e.g. inductive heating elements) may cause the article 201 to be heated (e.g. inductively heated) through the susceptor. In an alternative embodiment, the susceptor may be provided as part of the aerosol provision device 200 (e.g. as part of a holder for receiving the article 201).

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A metal housing for an aerosol provision device, the metal housing comprising:

a printed circuit board mounted within the metal housing;

a first contact spring providing a first electrical connection between a first connection point on an inside of the metal housing and a ground connection of the printed circuit board;

a second contact spring providing a second electrical connection between a second connection point on the inside surface of the metal housing and an antenna signal output for providing an antenna signal for transmission by the metal housing; and a radiating conductor element extending from a first surface element to a second surface element, wherein the first connection point and the second connection point points are provided on the radiating conductor element, and wherein a distance between the first surface element and the second surface element elements is at least one quarter of a wavelength of the antenna signal for transmission.

2. The metal housing as claimed in claim 1, wherein the radiating conductor element is an elliptical cylindrical radiating conductor element, the first surface element is a first elliptical surface element, and the second surface element is a second elliptical surface element.

3. The metal housing as claimed in claim 1 further comprising a signal feed source element and an antenna signal terminal, wherein the antenna signal terminal is connected to the second connection point and the signal feed source element is connected to the antenna signal terminal by the second contact spring.

4. The metal housing as claimed in claim 1, further comprising an impedance matching circuit.

5. The metal housing as claimed in claim 4, wherein the impedance matching circuit is adjustable.

6. The metal housing as claimed in claim 1, further comprising a control module for generating the antenna signal for transmission.

7. The metal housing as claimed in claim 1, wherein the metal housing is a housing for an electronic smoking article.

8. The metal housing as claimed in claim 1, wherein the antenna signal for transmission is a Bluetooth signal or a WiFi signal.

9. The metal housing as claimed in claim 1, wherein the metal housing fully encloses the printed circuit board.

10. An aerosol provision device comprising the metal housing as claimed in claim 1.

11. An electronic smoking article comprising the aerosol provision device as claimed in claim 10.

12. A method for enabling transmitting via a metal housing, the method comprising:

inserting a printed circuit board into the metal housing for an aerosol provision device such that a first contact spring of the printed circuit board provides an electrical connection between a first connection point on an inside of the metal housing and a ground connection of the printed circuit board, and a second contact spring of the printed circuit board provides an electrical connection between a second connection point on the inside surface of the metal housing and an antenna signal output for providing the metal housing with an antenna signal for transmission by the metal housing, wherein the metal housing comprises a radiating conductor element extending from a first surface element to a second surface element, wherein the first connection point and the second connection point points are provided on the radiating conductor element, and wherein a distance between the first surface element and the second surface element is at least one quarter of a wavelength of the antenna signal for transmission.

13. The method as claimed in claim 12, further comprising matching an impedance between an antenna signal generating circuit and the metal housing.

14. The method as claimed in claim 13, further comprising adjusting the impedance matching.

15. The method as claimed in claim 13, further comprising generating the antenna signal for transmission by the antenna signal generating circuit.

16. The method as claimed in claim 12, wherein the antenna signal for transmission is a Bluetooth signal or a WiFi signal.

17. The method as claimed in claim 12, further comprising using the antenna signal for communications with a mobile communication device.

18. The method as claimed in claim 12, wherein the antenna signal is used for locating the aerosol provision device.

19. A method for determining a location of an aerosol provision device, the method comprising:

receiving communications at a mobile communication device from the aerosol provision device; and determining the location of the aerosol provision device based on the received communications, wherein the aerosol provision device comprises:

a printed circuit board mounted within a metal housing;

a first contact spring providing a first electrical connection between a first connection point on an inside of the metal housing and a ground connection of the printed circuit board;

a second contact spring providing a second electrical connection between a second connection point on the inside surface of the metal housing and an antenna signal output for providing an antenna signal for transmission by the metal housing; and a radiating conductor element extending from a first surface element to a second surface element, wherein the first connection point and the second connection point points are provided on the radiating conductor element, and wherein a distance between the first surface element and the second surface element elements is at least one quarter of a wavelength of the antenna signal for transmission.

20. The method as claimed in claim 19, further comprising plotting the determined location on a display of the mobile communication device.

* * * * *